United States Patent Office 2,855,387
Patented Oct. 7, 1958

2,855,387

TERPOLYMER OF MALEIC ANHYDRIDE, VINYL ACETATE AND ALKYL ACRYLATE

Gerald R. Barrett, Winchester, Mass., assignor to Monsanto Chemical Company, St. Louis, Mo., a corporation of Delaware No Drawing. Application December 20, 1954
Serial No. 476,553

4 Claims. (Cl. 260—78.5)

This invention relates to modified copolymers of vinyl acetate and maleic anhydride. More particularly the invention relates to terpolymers of vinyl acetate, maleic anhydride and esters of acrylic or methacrylic acids.

Vinyl acetate copolymerizes quite rapidly with maleic anhydride usually in substantially equimolar proportions. The copolymer is insoluble in eithed monomer and separates out as a gel before polymerization is complete. These gels are hard to purify and contribute to the production of heterogeneous materials. Furthermore the copolymers of vinyl acetate and maleic anhydride are quite hard and brittle.

One object of this invention is to provide new terpolymers of vinyl acetate, maleic anhydride and alkyl esters of acrylic and methacrylic acids.

A further object is to modify copolymers of vinyl acetate and maleic anhydride to render them softer and less brittle.

Another object is to modify vinyl acetate-maleic anhydride copolymers so that substantially no gel formation occurs in the polymerization reaction.

These and other objects are attained by copolymerizing vinyl acetate with maleic anhydride and an alkyl ester of acrylic or methacrylic acid in a mass polymerization system in the presence of a free radical producing catalyst.

The following examples are given in illustration and are not intended as limitations on the scope of this invention. Where parts ade mentioned they are parts by weight.

*Example I*

Mix together about 45 parts of vinyl acetate, about 49 parts of maleic anhydride and about 5 parts of ethyl acrylate. Add to the mixture, about 0.3 part of tertiary butyl perbenzoate and about 0.05 part of di(tertiary butyl)peroxide. Remove air from the reaction vessel by flushing with nitrogen and heat the mixture at 50–70° C. until the reaction begins as evidenced by a thickening of the reaction medium. Then reduce the temperature to 40–60° C. and maintain the reaction mixture at this temperature for about 20 hours. Then increase the temperature slowly and gradually to about 105° C. over a period of about 36 hours. The final product is a hard solid which can be pulverized to form a fine powder. The product is soluble in water, and the aqueous solutions thereof are particularly suitable for sizing textile yarns. It has a viscosity of about 15 centipoises in a 5% aqueous solution at 25° C.

*Example II*

Mix together 42 parts of vinyl acetate, 48 parts of maleic anhydride, 10 parts of ethyl acrylate, 0.05 part of benzoyl peroxide, and 0.3 part of tertiary butyl perbenzoate. Heat the mixture for a short time at 50–70° C. to initiate the reaction and then maintain the reaction mixture at 40–60° C. for about 20 hours. Then raise the reaction temperature slowly and gradually to about 105° C. over a period of about 36 hours. The product is a hard clear mass having a slight yellow tint. The product may be pulverized to form a molding powder. The powder is soluble in water and aqueous solutions thereof are useful as textile sizes and in coating compositions. The viscosity of the 5% aqueous solutions of the powder ranges from 30–45 centipoises at 25° C.

*Example III*

Mix together 42 parts of vinyl acetate, 48 parts of maleic anhydride, 10 parts of ethyl acrylate, 0.1 part of benzoyl peroxide, 0.3 part of tertiary butyl perbenzoate, and 0.06 part of beta nitro styrene. Polymerize the mixture using the same cycle as shown in Example II. The product is similar to that of Example II except that the viscosity of a 5% aqueous solution at 25° C. ranges from 7–12 centipoises.

*Example IV*

Mix together 43 parts of vinyl acetate, 50 parts of maleic anhydride and about 7 parts of methyl methacrylate and add to the mixture 0.05 part of benzoyl peroxide, 0.3 part of tertiary butyl perbenzoate and about 0.015 part of beta nitro styrene. Initiate polymerization by a short preliminary heating at 50–70° C., continue polymerization with agitation at 40–60° C. for about 20 hours and finish the polymerization by gradually increasing the temperature to 105° C. over a period of about 36 hours. The product is a hard clear and nearly colorless mass. It may be pulverized to form a molding powder. The powder is soluble in water and 5% aqueous solutions thereof have a viscosity of 20–25 centipoises at 25° C. The aqueous solutions are useful as textile sizes and as ingredients of aqueous coating compositions.

The terpolymers of this invention are prepared by polymerizing together a mixture of vinyl acetate, maleic anhydride and an alkyl ester of acrylic or methacrylic acid in the presence of a free radical producing catalyst. The polymerization is best carried out in a mass process or in an organic liquid inert to the reactants which is a solvent for the monomers but not for the polymers. The polymerization reaction should be initiated by a relatively short heating cycle at 50–70° C. Thereafter the temperature should be reduced about 10° C. and the reaction continued with or without agitation for from 15–25 hours. Then the temperature should be raised slowly to from 100–120° C. over a period of from 30–40 hours. To insure completion of the reaction the temperature is held at the highest point for about 1–3 hours.

The amount of vinyl acetate should be regulated by the amount of maleic andydride so that a mol percent ratio of vinyl acetate to maleic anhydride of from 52–48 to 50–50 is attained. The amount of alkyl acrylic or methacrylic ester may be varied from 1 to about 30 mol percent of the final product.

The esters which are operative in this invention are alkyl esters of acrylic and methacrylic acids in which the alkyl groups contain from 1–8 carbon atoms including methyl, ethyl, propyl, butyl, isobutyl, 2-ethyl hexyl, octyl etc. groups.

The catalysts which may be used are free radical producing catalysts especially the peroxy type catalysts including the organic and inorganic peroxides and hydroperoxides, esters of peracids such as peracetic acid and perbenzoic acid, etc. Other free radical producing catalysts such as azonitriles, other organic azo compounds, tetra-alkyl diamino diphenyl methanes, etc., may be used. For many purposes it is desirable to use two or more catalysts. The total amount of catalyst may vary between 0.1 and 0.5 part per 100 parts of total monomer.

Using the mass process described above and the proportions of vinyl acetate, maleic anhydride and acrylic or methacrylic ester shown, substantially no gel separation is detected at any stage of the preparation of the terpolymer. If the acrylic or methacrylic ester is omitted from the reaction, gel separation occurs during the heating period at 50–70° C. and the product is a heterogeneous mixture.

The properties of the products vary with the type of ester and the amount of ester used. Most of the products are completely water-soluble without the use of alkali but the esters having the longer carbon chains reduce the solubility to the point where a small amount of alkali is necessary. The viscosity of the products as measured in 5% aqueous solutions at 25° C. may vary between 5 and 100 centipoises depending on the reaction conditions and the particular ester used.

For some purposes it is desirable to ensure that the viscosity of the products will be on the lower part of the range. To effect this lowering of viscosity, a small amount of a polymerization controlling agent such as the beta nitro styrene of the examples may be included. Other materials may be substituted for the beta nitro styrene such as, for example, various mercaptans.

The terpolymers of this invention are particularly useful in the form of aqueous solutions as sizing agents for various textiles and especially for nylon yarns. Since they are tougher than copolymers of vinyl acetate and maleic anhydride, the terpolymers provide a more abrasion resistant size which eliminates many of the difficulties previously experienced in the weaving of sized nylon yarns.

What is claimed is:

1. A terpolymer of vinyl acetate, maleic anhydride and an ester taken from the group consisting of alkyl esters of acrylic and methacrylic acids in which the alkyl groups contain from 1 to 8 carbon atoms, the ratio of vinyl acetate to maleic anhydride on a mol percent basis varying from 52–48 to 50–50 and the amount of ester varying from 1–30 mol percent of the terpolymer.

2. A terpolymer as in claim 1 wherein the ester is ethyl acrylate.

3. A terpolymer as in claim 1 wherein the ester is methyl methacrylate.

4. A process for preparing a terpolymer of vinyl acetate, maleic anhydride and an ester taken from the group consisting of alkyl esters of acrylic and methacrylic acids in which the alkyl groups contain from 1 to 8 carbon atoms, which comprises mixing the three monomeric components with a free radical producing catalyst, heating the mixture at 50–70° C. to initiate polymerization, then heating the mixture at 40–60° C. for 15–25 hours and then gradually raising the temperature to 100–120° C. over a period of 30–40 hours, the ratio of vinyl acetate to maleic anhydride on a mol percent basis varying from 52–48 to 50–50 and the amount of ester varying from 1–2 mol percent of the terpolymer.

References Cited in the file of this patent

UNITED STATES PATENTS

| | | |
|---|---|---|
| 2,047,398 | Voss et al. | July 14, 1936 |
| 2,616,867 | Rossin | Nov. 4, 1952 |
| 2,640,039 | Williams | May 26, 1953 |

OTHER REFERENCES

Seymour et al.: "Ind. and Eng. Chem.," vol. 41, No. 7 (1948), pages 1509–1513.